US008976377B2

(12) United States Patent
Matsunaga

(10) Patent No.: US 8,976,377 B2
(45) Date of Patent: Mar. 10, 2015

(54) IMAGE FORMING APPARATUS, CONTROL METHOD OF IMAGE FORMING APPARATUS, AND COMPUTER-READABLE RECORDING MEDIUM

(71) Applicant: Canon Kabushiki Kaisha, Tokyo (JP)

(72) Inventor: Daisuke Matsunaga, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/784,366

(22) Filed: Mar. 4, 2013

(65) Prior Publication Data

US 2013/0242327 A1 Sep. 19, 2013

(30) Foreign Application Priority Data

Mar. 6, 2012 (JP) ................................. 2012-049674

(51) Int. Cl.
*H04N 1/00* (2006.01)

(52) U.S. Cl.
CPC .... *H04N 1/00896* (2013.01); *H04N 2201/0094* (2013.01)
USPC ........................................ 358/1.13; 358/1.16

(58) Field of Classification Search
USPC ................ 358/1.9, 1.14, 1.13, 504, 406, 1.16
See application file for complete search history.

(56) References Cited

U.S. PATENT DOCUMENTS

| 2007/0286630 | A1* | 12/2007 | Watanabe et al. ............... 399/88 |
| 2011/0182208 | A1* | 7/2011 | Shima et al. ................... 370/254 |
| 2011/0194148 | A1* | 8/2011 | Kobayashi ................... 358/1.16 |
| 2011/0235108 | A1* | 9/2011 | Kato ............................. 358/1.15 |
| 2011/0236049 | A1* | 9/2011 | Haga ............................. 399/75 |
| 2012/0002222 | A1* | 1/2012 | Ohara ............................ 358/1.9 |
| 2012/0218597 | A1* | 8/2012 | Hashimoto ................... 358/1.15 |
| 2012/0268779 | A1* | 10/2012 | Sunagawa ..................... 358/1.15 |
| 2012/0278643 | A1* | 11/2012 | Nishikawa .................... 713/323 |
| 2013/0128299 | A1* | 5/2013 | Utoh et al. ................... 358/1.13 |
| 2013/0138986 | A1* | 5/2013 | Park et al. ..................... 713/320 |
| 2013/0215450 | A1* | 8/2013 | Hatano ......................... 358/1.14 |
| 2013/0219202 | A1* | 8/2013 | Iguchi ........................... 713/323 |
| 2013/0222833 | A1* | 8/2013 | Hirano ......................... 358/1.13 |
| 2013/0232257 | A1* | 9/2013 | Mukai et al. .................. 709/224 |
| 2013/0278958 | A1* | 10/2013 | Kuwahara .................... 358/1.13 |

FOREIGN PATENT DOCUMENTS

JP 10-173832 A 6/1998

* cited by examiner

*Primary Examiner* — Jerome Grant, II
(74) *Attorney, Agent, or Firm* — Canon U.S.A., Inc., IP Division

(57) ABSTRACT

An image forming apparatus including a first power supply state, a second power supply state, and a third power supply state includes a receiving unit configured to receive a job, a determination unit configured to determine whether the image forming apparatus is shifted from the first power supply state to the second power supply state, or from the first power supply state to the third power supply state based on a type of the received job, and a control unit configured to shift the power supply state of the image forming apparatus based on the determination result of the determination unit.

10 Claims, 15 Drawing Sheets

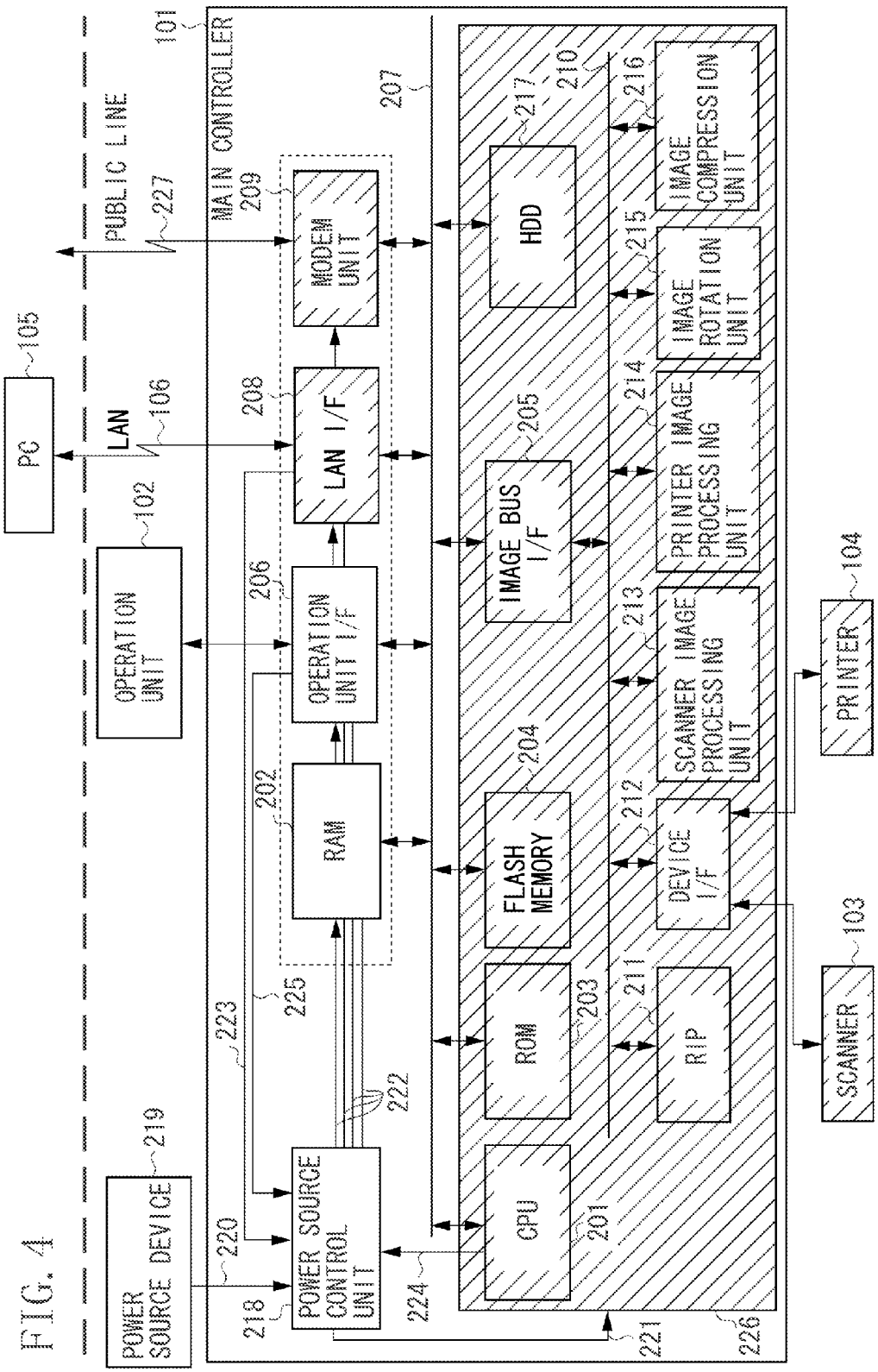

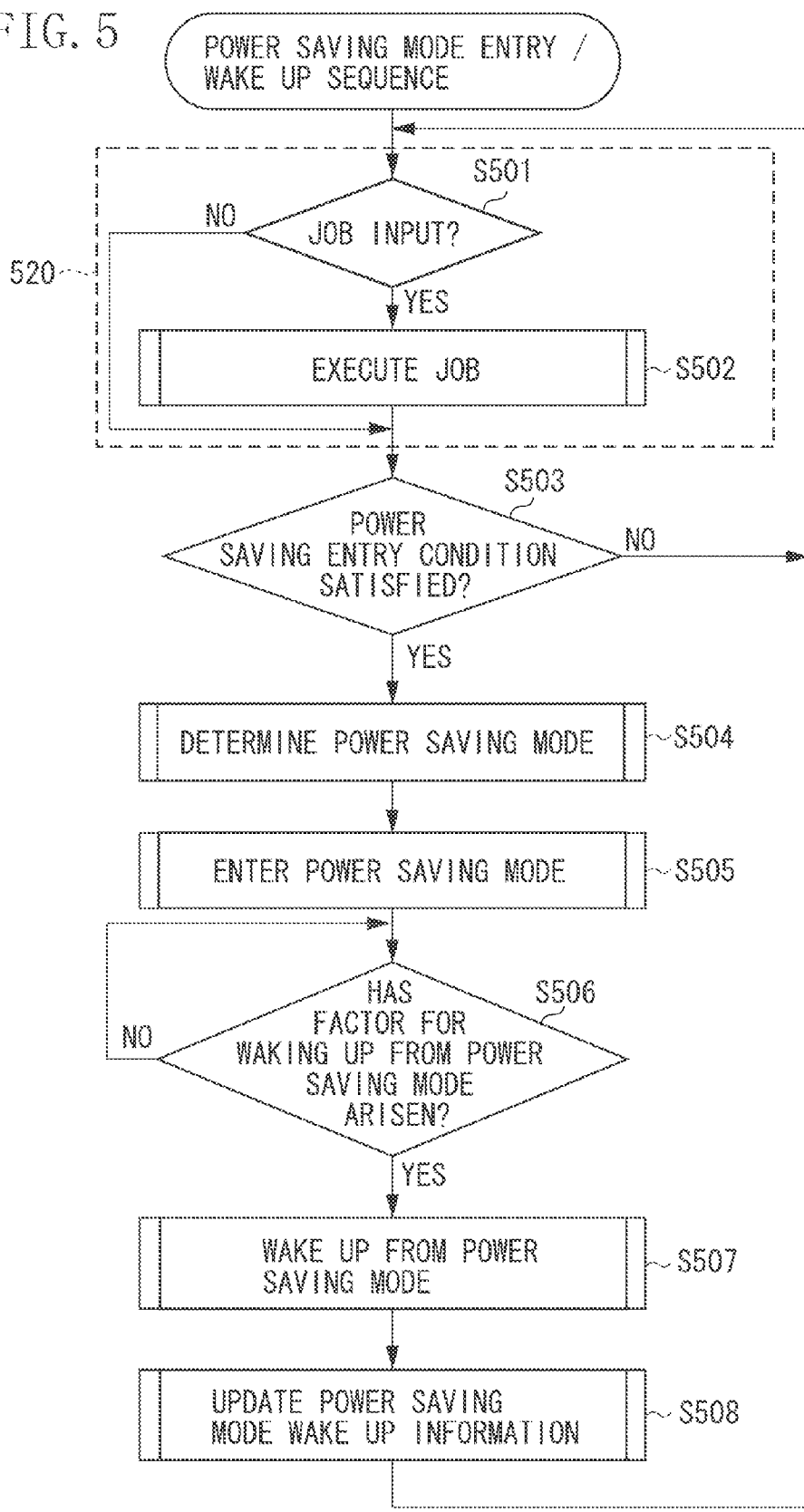

FIG. 8

| DAY OF THE WEEK | TIME | WAKE UP SECTION N | WAKE UP SECTION R |
|---|---|---|---|
| | ⋮ | ⋮ | ⋮ |
| MONDAY | HOUR 12 | TIMES 2 | TIME 0 |
| | HOUR 15 | TIMES 2 | TIME 0 |
| | HOUR 18 | TIME 1 | TIMES 2 |
| | ⋮ | ⋮ | ⋮ |
| TUESDAY | HOUR 12 | TIME 1 | TIME 0 |
| | HOUR 15 | TIMES 3 | TIME 0 |
| | HOUR 18 | TIMES 2 | TIMES 2 |
| | ⋮ | ⋮ | ⋮ |

| JOB SECTION N | PDL PRINT JOB |
|---|---|
| JOB SECTION R | COPY JOB, SEND JOB, SCAN-TO-BOX JOB, BOX-PRINT JOB, FAX JOB |

IMAGE FORMING APPARATUS, CONTROL METHOD OF IMAGE FORMING APPARATUS, AND COMPUTER-READABLE RECORDING MEDIUM

BACKGROUND OF THE INVENTION

1. Field of the Invention

The present invention relates to an image forming apparatus including a plurality of power saving modes, a control method of the image forming apparatus, and a recording medium.

2. Description of the Related Art

With the recent sudden increase in environmental awareness, there is an increasing need to reduce power consumption in a state in which an apparatus is not operating (non-operating state). A known measure to respond to this need is a power saving technique that reduces power consumption in a non-operating state by reducing or cutting off the normal power supply to a main control unit that controls a data processing apparatus when the data processing apparatus is in a non-operating state. However, since the power supply to a specific control unit is reduced or cut off during the power saving state, services that are provided in a normal power state cannot be received, so that usability deteriorates.

Accordingly, to respond to this problem, Japanese Patent Application Laid-Open No. 10-173832 discusses a technique that has a plurality of power saving modes in which the supported services are different. In this technique, the power saving mode that is entered is switched based on a history of past wake up factors for waking up from a power saving mode.

However, in the technique discussed in Japanese Patent Application Laid-Open No. 10-173832, when there is a wake up factor that cannot be detected based on a difference in the supported services, the wake up history cannot be acquired. Consequently, it may not be possible to determine which power saving mode to enter.

There are two factors for returning to a normal power mode from a power saving mode. One is a user operation performed on an operation unit, and another is a job packet input via a communication line. However, for a system having a power saving mode that turns off the power supply to a communication interface, the only factor for waking up from a power saving mode is a user operation performed on an operation unit. Consequently, even if information about this wake up factor is stored as a history, the power saving mode to be entered cannot be determined. Thus, there is the problem that usability is insufficient.

SUMMARY OF THE INVENTION

According to an aspect of the present invention, an image forming apparatus including a first power supply state configured to supply power to a part of the image forming apparatus, a second power supply state configured to stop supplying power to the part of the image forming apparatus, and a third power supply state configured to stop supplying power to the part of the image forming apparatus, includes a receiving unit configured to receive a job, a determination unit configured to determine whether the image forming apparatus is shifted from the first power supply state to the second power supply state, or from the first power supply state to the third power supply state, and a control unit configured to shift the image forming apparatus from the first power supply state to the second power supply state when the determination unit determines that the image forming apparatus is shifted from the first power supply state to the second power supply state, and shift the image forming apparatus from the first power supply state to the third power supply state when the determination unit determines that the image forming apparatus is shifted from the first power supply state to the third power supply state.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 illustrates an example of a power supply state in a RAM storage mode according to an exemplary embodiment.

FIG. 5 is a flowchart illustrating an example of a processing procedure for entry into a power saving mode and return to a normal power mode according to a first exemplary embodiment.

FIG. 8 illustrates an example of power saving mode wake up information.

FIG. 10 illustrates an example in which jobs are classified into a job section N and a job section R.

DESCRIPTION OF THE EMBODIMENTS

Various exemplary embodiments, features, and aspects of the invention will be described in detail below with reference to the drawings.

Figure 1:
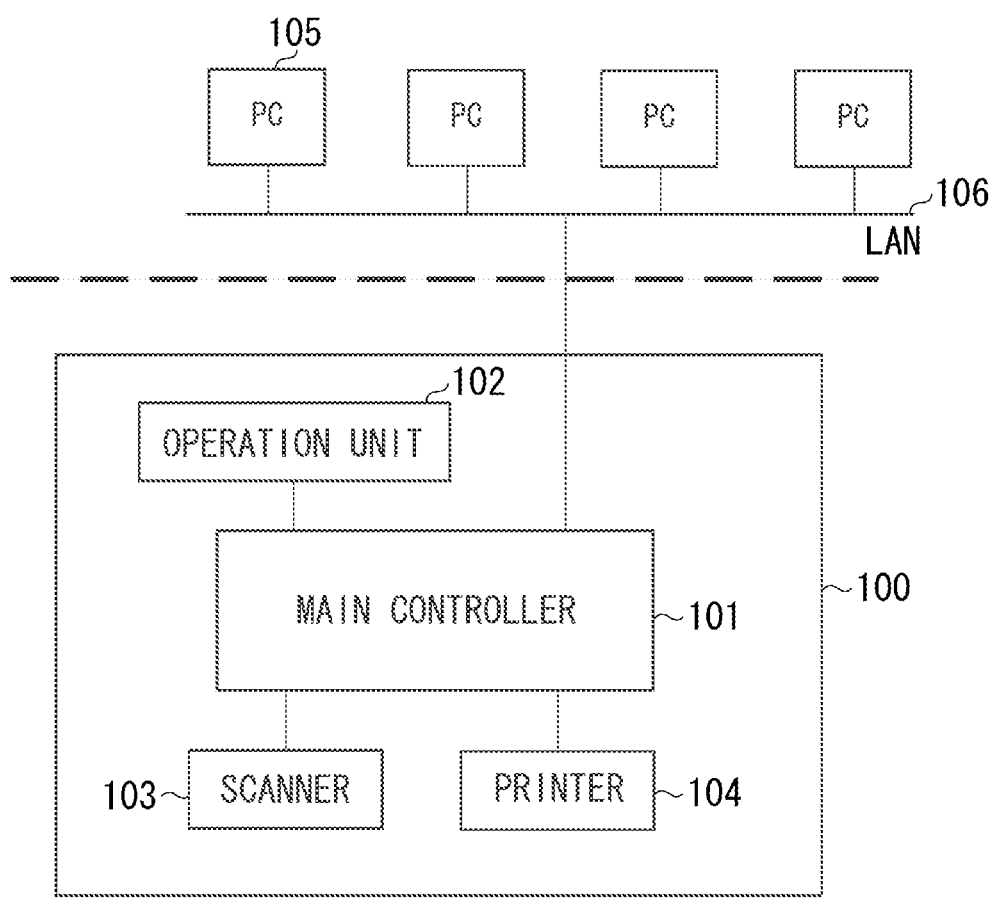
FIG. 1 is a block diagram illustrating an overall configuration example of an image processing system according to an exemplary embodiment.

FIG. 1 is a block diagram illustrating an overall configuration example of an image processing system according to the present exemplary embodiment. In FIG. 1, a data processing apparatus 100 is a multifunction peripheral that, in addition to inputting and outputting image data, also performs various kinds of image processing. The data processing apparatus 100 includes a main controller 101, an operation unit 102 that acts as a user interface, a scanner 103 that acts as an image input device, and a printer 104 that acts as an image output device.

The operation unit 102, the scanner 103, and the printer 104 are each connected to the main controller 101, and are controlled based on instructions from the main controller 101. Further, the main controller 101 is connected to a local area network (LAN) 106, and is also connected to a personal computer (PC) 105 and the like connected to the LAN 106.

Next, the configuration of the data processing apparatus 100 according to the present exemplary embodiment will be described in more detail with reference to the block diagram of FIG. 2.

Figure 2:
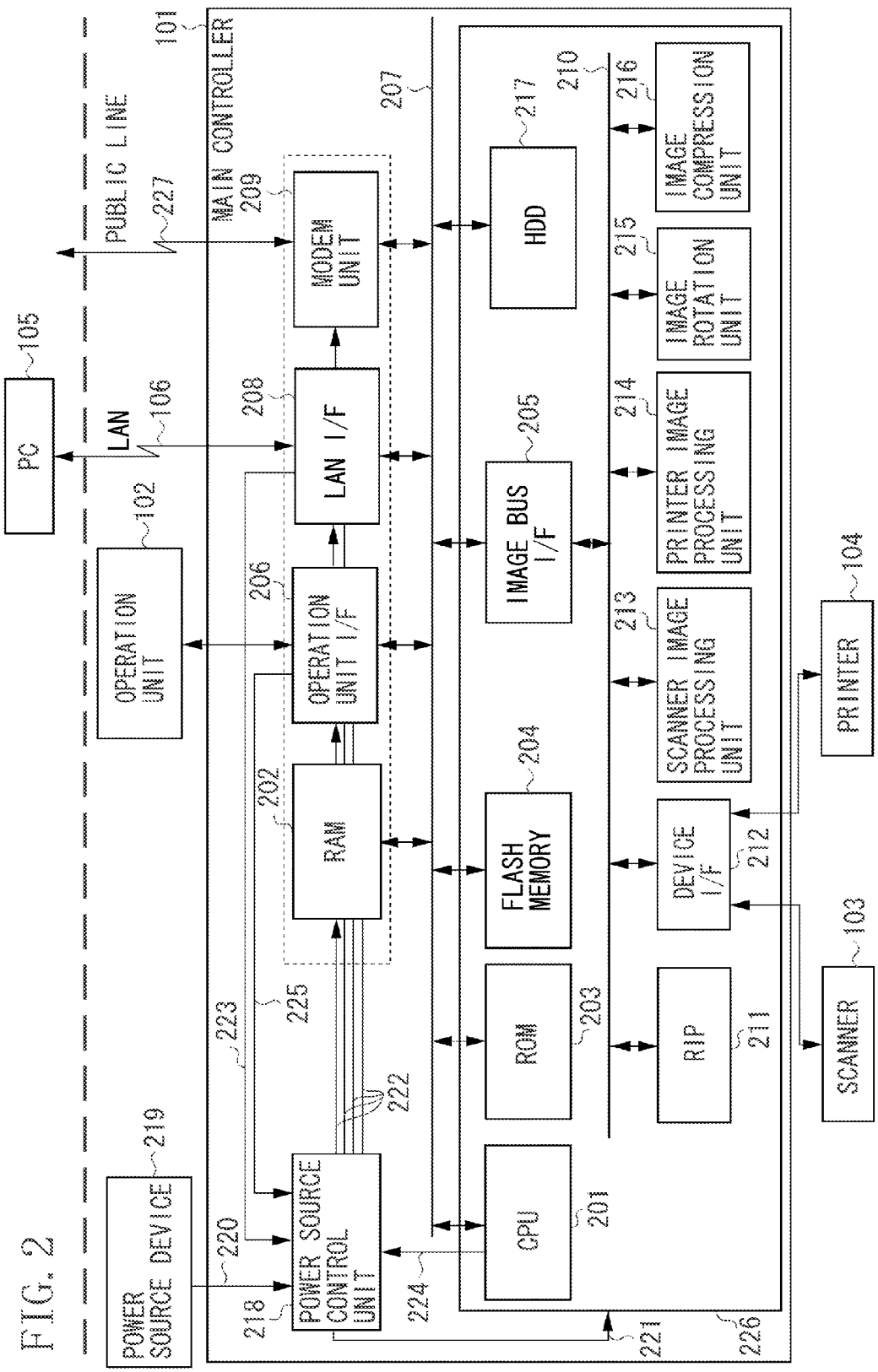
FIG. 2 is a block diagram illustrating a configuration example of a data processing apparatus according to an exemplary embodiment.

As illustrated in FIG. 2, the main controller 101 in the data processing apparatus 100 is connected to a public line 227 in addition to the LAN 106. Further, the main controller 101 inputs and outputs image data, device information, files and the like to/from an external apparatus via the LAN 106 and the public line 227.

The main controller 101 includes a central processing unit (CPU) 201 that acts as a main control unit. The CPU 201 is connected via a system bus 207 to various memory units, such as a random access memory (RAM) 202, a read-only memory (ROM) 203, and a flash memory 204. Further, the CPU 201 is connected to external interfaces (I/Fs), such as an image bus I/F 205, an operation unit I/F 206, a LAN I/F 208, and a modem unit 209.

The RAM 202 is an on-demand readable/writable memory for providing a work area for the CPU 201. The RAM 202 is also used as an image memory for temporarily storing image data. The ROM 203 is a boot ROM in which a system boot program is stored. The flash memory 204 is a non-volatile memory, in which system software and setting value data are stored that need to be stored even after power to the data processing apparatus 100 has been cut off.

The operation unit I/F 206 is an interface for performing input and output of information to/from the operation unit 102. The operation unit I/F 206 outputs to the operation unit 102 image data relating to the image to be displayed, or transfers information input by the user via the operation unit 102 to the CPU 201. The LAN I/F 208, which is an interface for connecting with the LAN 106, performs the input and output of information to the LAN 106. The modem 209, which is an interface for connecting with the public line 227, performs the input and output of information to the public line 227.

The image bus I/F 205, which is an interface for connecting with an image bus 210 that transfers image data to a system bus 207 at high speed, operates as a bus bridge that converts a data structure. The image bus 210 is connected to a raster image processor (RIP) 211, a device I/F 212, a scanner image processing unit 213, a printer image processing unit 214, an image rotation unit 215, and an image compression unit 216.

The RIP 211 rasterizes page description language (PDL) data received from the LAN 106 into a bitmap image. The device I/F 212, which is an interface that connects the scanner 103 and the printer 104 with the main controller 101, performs synchronous/asynchronous system conversion of the image data. Further, the power source control to each device is also performed via this device I/F 212.

The scanner image processing unit 213 performs processing such as correction, image processing, and editing on image data read from the scanner 103. The printer image processing unit 214 performs processing such as color conversion, filtering, and resolution conversion on the image data output to the printer 104. The image rotation unit 215 performs rotation of image data. The image compression unit 216 performs compression/decompression processing based on Joint Photographic Experts Group (JPEG) on multivalued image data, and joint bi-level image experts group (JBIG), modified modified read (MMR), and modified Huffman (MH) for binary image data.

A hard disk drive (HDD) 217 is a non-volatile storage device, which stores various types of data, such as image data, address book data, a job log, and user individual data (preference data). If the main controller 101 is not connected to the HDD 217, the above-described various types of data are stored in the flash memory 204.

A power source control unit 218 supplies direct current (DC) power received from a power source device 219, which is a power supply means, via a power supply line 220 to predetermined circuit elements in the main controller 101 via power supply lines 221 and 222. The power source control unit 218 performs power supply control of the power supply lines 221 and 222 based on a control signal received from the LAN I/F 208 via a control signal line 223.

Similarly, the power source control unit 218 performs power supply control of the power supply lines 221 and 222 based on a control signal received from the operation unit I/F 206 via a control signal line 225. Further, the power source control unit 218 also performs power supply control of the power supply lines 221 and 222 based on a control signal received from the CPU 201 via a control signal line 224.

The power supply line 221 is connected to the CPU 201, the ROM 203, the HDD 217, and the image bus I/F 205. Further, the power supply line 221 is also connected to the RIP 211, the device I/F 212, the scanner image processing unit 213, the printer image processing unit 214, the image rotation unit 215, and the image compression unit 216. The power supply line 222 is connected to the RAM 202, the operation unit I/F 206, the LAN I/F 208, and the modem unit 209, respectively, so that power to each of these units can be independently controlled.

The data processing apparatus 100 can, based on the power state, perform control in three operation modes; a normal power mode and two power saving modes, i.e., an N/W standby mode (a first power saving mode) and a RAM storage mode (a second power saving mode). In the normal power mode, the power source device 219 supplies power to the power source control unit 218 via the power supply line 220.

The CPU 201 also controls the power source control unit 218 so that power is supplied to the power supply lines 221 and 222. Further, the power supply line 222 is configured from a plurality of lines, so that power to the RAM 202, the operation unit I/F 206, the LAN I/F 208, and the modem unit 209, respectively, can be independently controlled.

In the normal power mode, power is supplied to all of the power supply lines 221 and 222, and power is supplied to all of the modules in the main controller 101. In the normal power mode, all jobs input by the user can be immediately executed.

For example, the data processing apparatus 100 according to the present exemplary embodiment can execute a copy job, a send job, a scan-to-box job, a box-print job, a PDL print job, and a FAX job, which will each be described below.

In a copy job, send job, and a scan-to-box job, based on an instruction from the operation unit 102, image data is acquired from the scanner 103 and the acquired image data is stored in the RAM 202. Then, the image data stored in the RAM 202 is subjected to predetermined processing by the units from the scanner image processing unit 213 to the image compression unit 216.

Then, for a copy job, the image data is transferred to the printer 104 and printed. For a send job, the image data is transferred from the LAN I/F 208 to the PC 105 via the LAN 106. Further, for a scan-to-box job, the image data is stored in the HDD 217.

In a box-to-print job, image data stored in the HDD 217 by a scan-to-box job, for example, is subject to image processing by the units from the printer image processing unit 214 to the image compression unit 216, and the processed image data is transferred to the printer 104 and printed.

In a PDL print job, PDL data transmitted from the PC 105 and input into the LAN I/F 208 via the LAN 106 is transferred to the RAM 202. Then, the PDL data is rasterized by the RIP 211, and the rasterized image is subjected to predetermined processing by the units from the scanner image processing unit 213 to the image compression unit 216. The processed image data is then transferred to the printer 104 and printed.

In a FAX job, binary image data acquired via the public line 227 and the 209 is stored in the RAM 202. The binary image data stored in the RAM 202 is subjected to predetermined processing by the units from the scanner image processing unit 213 to the image compression unit 216, and the processed image data is then transferred to the printer 104 and printed.

On the other hand, the data processing apparatus 100 according to the present exemplary embodiment can be controlled in two power saving modes, a N/W standby mode and a RAM storage mode.

Figure 3:
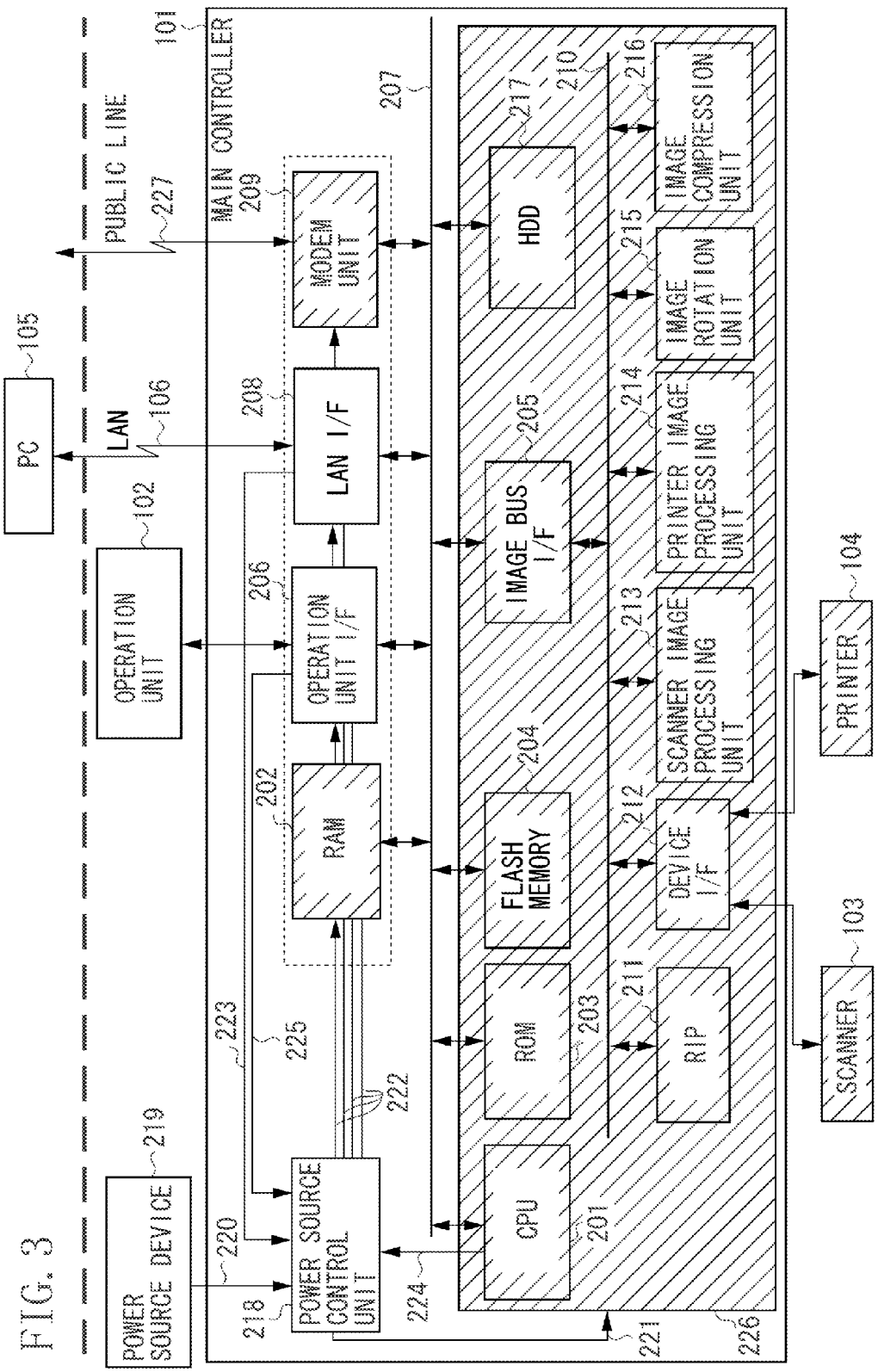
FIG. 3 illustrates an example of a power supply state in an N/W standby mode according to an exemplary embodiment.

FIG. 3 illustrates an example of a power supply state in the N/W standby mode, and FIG. 4 illustrates an example of a power supply state in the RAM storage mode. The grey portion illustrated in FIGS. 3 and 4 represents that the supply of power by the power source control unit 218 is set to OFF. In both of these power saving modes, the supply of power to a common section 226 via the power supply line 221 is set to OFF.

In the N/W standby mode, the supply of power to the RAM 202 and the modem 209 via the power supply line 222 is also set to OFF. Further, in the RAM storage mode, the supply of power to the LAN I/F 208 and the modem 209 via the power supply line 222 is set to OFF.

In each power saving mode, the power source device 219 supplies power to the power source control unit 218 via the power supply line 220. The CPU 201 controls the power source control unit 218 so that the supply of power to the common section 226 by the power supply line 221 is turned off.

Similarly, the CPU 201 controls the power source control unit 218 so that the supply of power to the RAM 202, the operation unit I/F 206, the LAN I/F 208, and the modem 209 by the power supply line 222 is selectively turned off. At this time, the supply of power is cut off to the main circuit elements including the CPU 201 in the main controller 101. Consequently, in the power saving mode, power consumption by the data processing apparatus 100 can be substantially reduced compared with a normal power mode.

In addition, in the N/W standby mode illustrated in FIG. 3, data such as a print job from the PC 105 connected to the LAN 106 can be received by the LAN I/F 208. In this case, the data processing apparatus 100 can be returned to a normal power mode from a power saving mode by the LAN I/F 208 controlling the power source control unit 218.

Thus, in the N/W standby mode, since the power supply to the operation unit I/F 206 is left ON, compared with RAM storage mode, in which the data processing apparatus 100 can only wake up from an operation by the operation unit 102, usability is higher when using many jobs input via the LAN 106.

On the other hand, in the RAM storage mode illustrated in FIG. 4, although the data processing apparatus 100 can only be woken up based on one type of operation by the operation unit 102, since the power source device 219 supplies power to the RAM 202, the RAM 202 can back up the system program by a self-refresh operation. Consequently, in the RAM storage mode, the wake up operation of the whole system can be performed rapidly, so that compared with the N/W standby mode, which has to initialize the system from the beginning, usability is higher when using many jobs input from the operation unit 102.

Further, the data processing apparatus 100 enters the RAM storage mode even when a (not illustrated) main power switch (sequence switch) is turned off. When the main power switch is off, the data processing apparatus 100 is not completely off, rather it is in a state in which power is supplied to only the RAM 202. A program for starting up the data processing apparatus 100 from the state in which the main power switch is turned off is stored in the RAM 202. When the main power switch is turned on, the data processing apparatus 100 rapidly starts up using this program stored in the RAM 202.

In the power saving modes according to the present exemplary embodiment, although the supply of power to the CPU 201 is cut off, the present invention is not limited to this. For example, as another embodiment, the power saving mode may be configured so that the supply of power to the CPU 201 is reduced from the normal power mode.

Next, the sequence for entry into a power saving mode and return to a normal power mode by the data processing apparatus 100 will be described with reference to the flowchart illustrated in FIG. 5. Unless stated otherwise, the processing illustrated in FIG. 5 is performed based on control from the CPU 201 based on a program stored on the RAM 202.

First, in step S501, the data processing apparatus 100 determines whether any of the above-described jobs has been input in an idle state in a normal power mode. If it is determined that a job has been input (YES in step S501), in step S502, the specified job is executed. The processing performed in step S502 will be described in more detail below.

On the other hand, if it is determined that a job has not been input (NO in step S501), in step S503, the data processing apparatus 100 determines whether an entry condition to a power saving mode is satisfied. In the present exemplary embodiment, examples of an entry condition to a power saving mode may include the detection of the elapse of a predetermined duration by a (not illustrated) timer, an instruction to enter a power saving mode from the operation unit 102 by the user and the like. If it is determined that an entry condition to a power saving mode is not satisfied (NO in step S503), an idle state continues, and the processing returns to step S501.

On the other hand, if it is determined that an entry condition to a power saving mode has been satisfied (YES in step S503), in step S504, the data processing apparatus 100 determines the power saving mode. Although step S504 will be described in detail below, basically, the data processing apparatus 100 determines whether to enter an N/W standby mode or a RAM storage mode. When the power saving mode to be entered is determined, in step S505, the data processing apparatus 100 enters that power saving mode. The entry processing performed in step S505 will be described in detail below.

When the data processing apparatus 100 has entered the power saving mode, in step S506, the data processing apparatus 100 enters the power saving state illustrated in FIG. 3 or 4, and waits in that power saving mode until a factor for returning to a normal power mode from the power saving mode arises. In the present exemplary embodiment, examples of factors for returning to a normal power mode include when there is an instruction to return to a normal power mode from the operation unit 102 by the user, when a job has been input from the PC 105 into the LAN I/F 208 via the LAN 106 and the like. If it is determined that a factor for returning to normal power mode has arisen (YES in step S506), in step S507, the data processing apparatus 100 wakes up from the power saving mode to the normal power mode. Further, based on the above wake up factor, in step S508, the below-described power saving mode wake up information is updated, and the data processing apparatus 100 returns to an idle state in the normal power mode. The processing performed in steps S507 and S508 will be described in more detail below.

Although the processing performed in steps S501, S503, and S506 is described based on polling processing in order to simplify the description, this processing can also be implemented based on interruption processing performed by multitasking. Specifically, the determination processing performed when waiting for a job to be input in step S501 and waiting to enter a power saving mode in step S503 may be operated simultaneously in parallel.

Next, a detailed sequence for the processing to return to the normal power mode performed in step S507 and for the processing to update the power saving mode wake up information performed in step S508 will be described with reference to the flowcharts illustrated in FIG. 6.

Figure 6A:
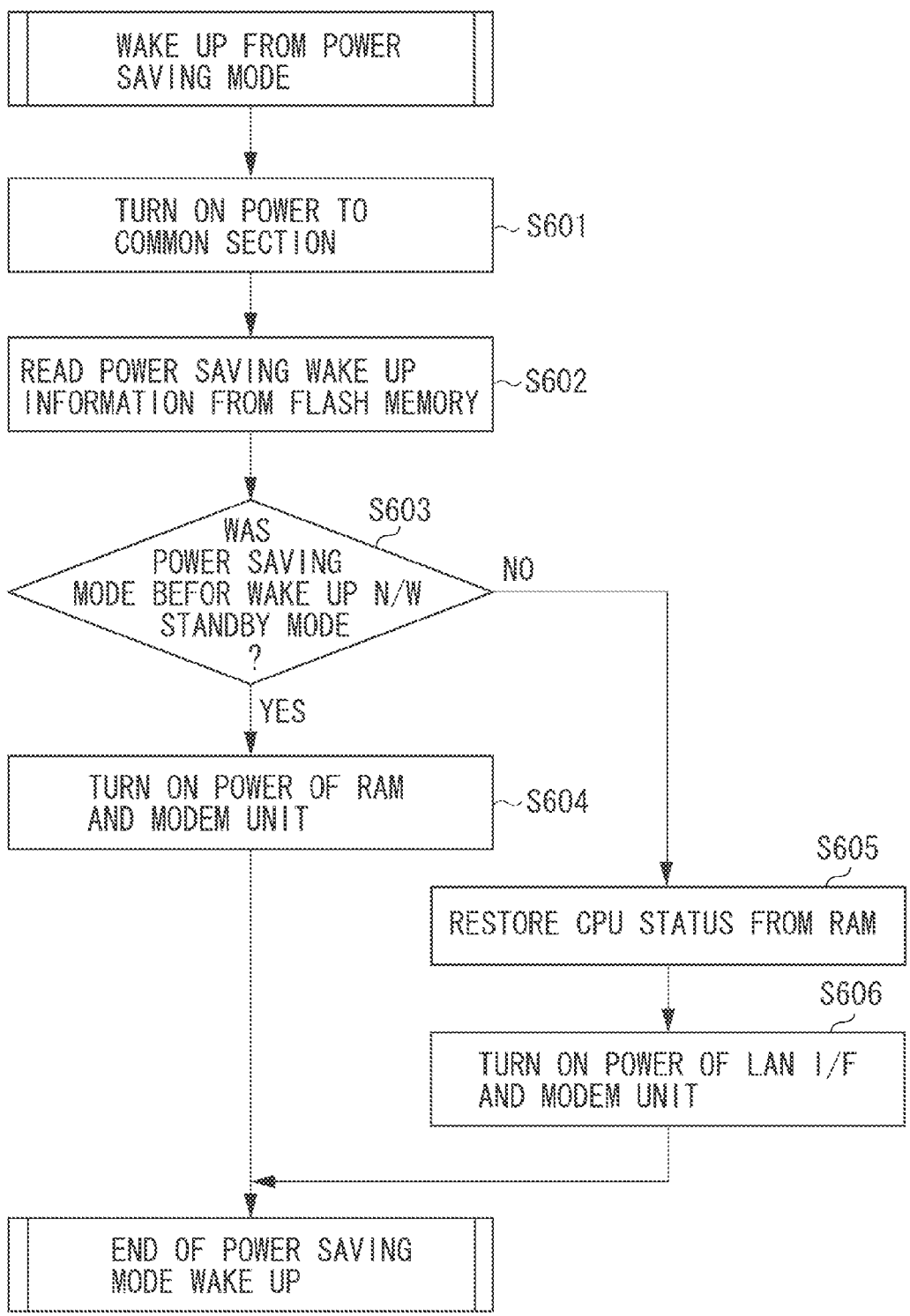
FIG. 6A and FIG. 6B are flowcharts illustrating an example of a detailed processing procedure for returning to a normal power mode and a detailed processing procedure for updating power saving mode wake up information according to the first exemplary embodiment.

FIG. 6A is a flowchart illustrating an example of a detailed processing procedure for returning to a normal power mode performed in step S507 of FIG. 5. In step S506 of FIG. 5, if there has been an instruction from the operation unit 102 by the user to return to a normal power mode, a wake up instruction is transmitted to the power source control unit 218 from the operation unit I/F 206 via the 225.

On the other hand, if a job has been input to the LAN I/F 208 from the PC 105 via the LAN 106, a wake up instruction is transmitted to the power source control unit 218 from the LAN I/F 208 via the control signal line 223. When an instruction to return to normal power mode is made based on either of the above methods, in step S601, power is supplied to the common section 226 from the power source control unit 218 via the power supply line 221.

Next, in step S602, the CPU 201, to which power has been supplied, reads the power saving mode wake up information stored in the flash memory 204 during the below-described entry into a power saving mode. This power saving mode wake up information is information that indicates, before returning to the normal power mode, which power saving mode was entered, the N/W standby mode or the RAM storage mode. The power saving mode wake up information is stored in the flash memory 204 just before entering the power saving mode.

In step S603, the data processing apparatus 100 determines whether the power saving mode before the wake up was an N/W standby mode or a RAM storage mode by referring to the read power saving mode wake up information. If it is determined that the power saving mode before the wake up was an N/W standby mode (YES in step S603), in step S604, the data processing apparatus 100 turns on the supply of power to the RAM 202 and the modem 209 from the power source control unit 218 via the power supply line 222. This processing is performed by issuing an instruction from the CPU 201 to the power source control unit 218 via the control signal line 224.

On the other hand, if it is determined that the power saving mode before the wake up was a RAM storage mode (NO in step S603), in step S605, the data processing apparatus 100 reads the CPU status before the wake up from the RAM 202, to which power is supplied and is operating, and restores the CPU register. Then, in step S606, the data processing apparatus 100 turns on the supply of power to the LAN I/F 208 and the modem 209 from the power source control unit 218 via the power supply line 222. This processing is performed by issuing an instruction from the CPU 201 to the power source control unit 218 via the control signal line 224.

Since the above processing to return to the normal power mode is performed before booting the CPU or just after booting, it is realized by the operating programs on the ROM 203.

Based on the above processing, the data processing apparatus 100 returns to a normal power mode from a power saving mode, and enters an idle state waiting for a job.

Figure 6B:
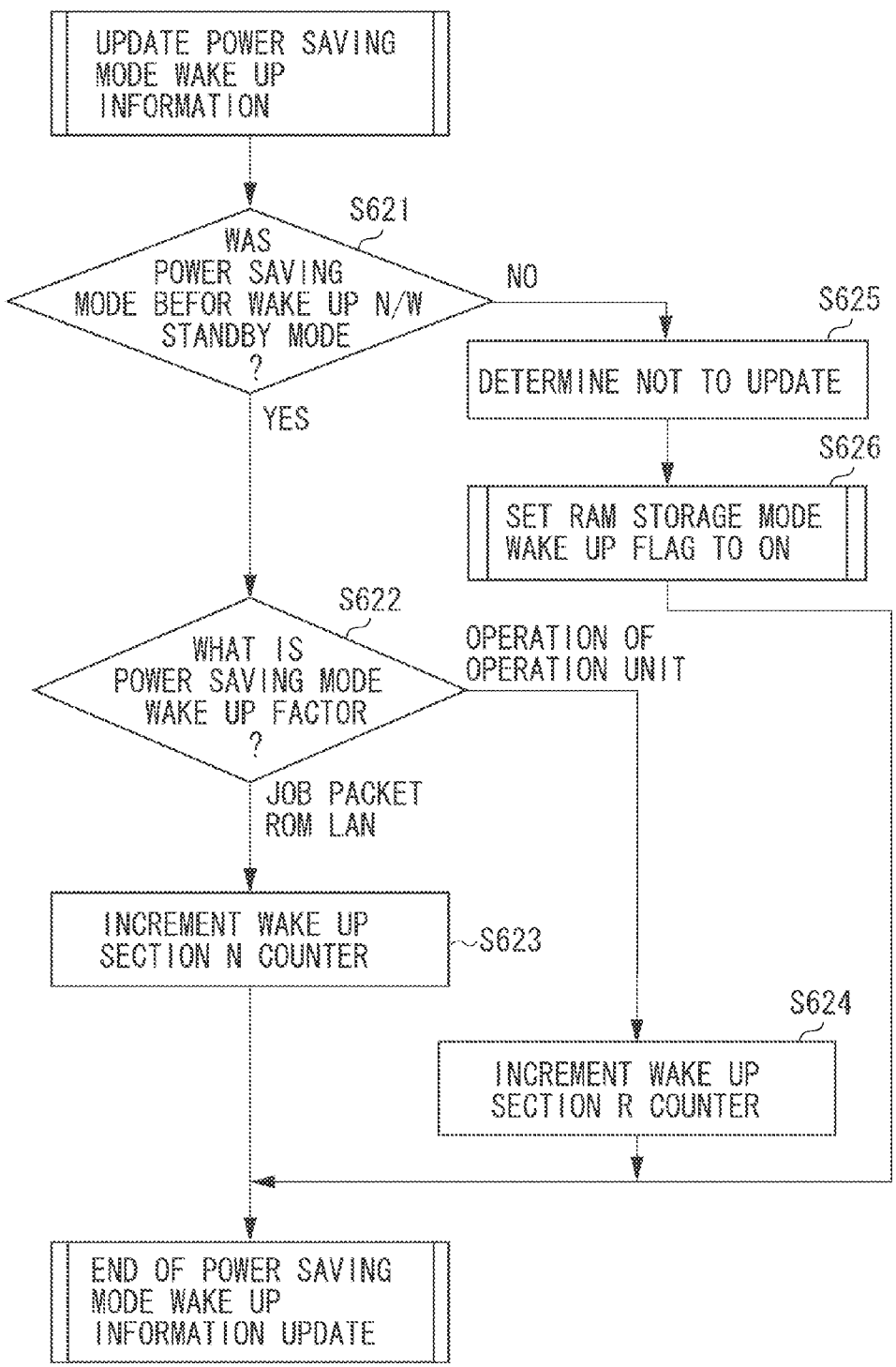

FIG. 6B is a flowchart illustrating an example of a detailed processing procedure for updating power saving mode wake up information performed in step S508 of FIG. 5.

First, in step S621, based on the power saving mode wake up information acquired in step S602 of FIG. 6A, the data processing apparatus 100 determines whether the power saving mode before the wake up was an N/W standby mode or a RAM storage mode. If it is determined that the power saving mode before the wake up was the N/W standby mode (YES in step S621), in step S622, the data processing apparatus 100 further determines the wake up factor for the return to normal power mode. Specifically, the data processing apparatus 100 determines whether the wake up factor is an instruction from the operation unit 102 by the user to return to normal power mode or the input of a job to the LAN I/F 208.

For example, an interruption status register is included in the operation unit I/F 206 and the LAN I/F 208, so that when returning to a normal power mode based on the respective wake up factor, an interruption status is kept. Consequently, by reading this interruption status register with the CPU 201, the data processing apparatus 100 can specify which wake up factor was the cause for returning to normal power mode.

If it is determined that the wake up factor was the input of a job into the LAN I/F 208 ("JOB PACKET FROM LAN" in step S622), in step S623, the data processing apparatus 100 increments the wake up section N counter.

The wake up section N counter will be described below. Further, if it is determined that the wake up factor was an instruction to wake up by the operation unit 102 ("OPERATION OF OPERATION UNIT" in step S622), in step S624, the data processing apparatus 100 increments the wake up section R counter. The wake up section R counter will be described below.

FIG. 8 illustrates an example of power saving mode wake up information

As illustrated in FIG. 8, power saving mode wake up information 801 is configured from a table, and is stored in the flash memory 204 or the RAM 202. In the present exemplary embodiment, the table includes two counters, i.e., a wake up section N counter 802 and a wake up section R counter 803, for every 3 hours for each day of the week.

The wake up section N counter 802 is counted up when there has been an event indicating that it is desirable to enter an N/W standby mode the next time when entering a power saving mode. The wake up section R counter 803 is counted up when there has been an event indicating that it is desirable to enter a RAM storage mode the next time when entering a power saving mode.

Further, for the RAM storage mode, since power is not being supplied to the LAN I/F 208, a job cannot be received via the LAN 106. However, in the N/W standby mode, a job can be received. Therefore, if the wake up factor for returning to a normal power mode was the input of a job via the LAN 106, usability is higher for the N/W standby mode than for the RAM storage mode.

On the other hand, for the N/W standby mode, since power is not being supplied to the RAM 202, the processing time until a device returns to the state (including software) it was in before entering the power saving mode is longer. However, in the RAM storage mode, since the software state of before entering the power saving mode is stored, the processing time until a device returns to the state (including software) it was in before entering the power saving mode is short.

Therefore, if the wake up factor for returning to the normal power mode was a wake up instruction from the operation unit 102, usability is higher for the RAM storage mode than for the N/W standby mode.

Returning to the description of FIG. 6B, if it is determined in step S621 that the power saving mode before the wake up was the N/W standby mode (YES in step S621), for the reasons described above, the power saving mode that is desirable to enter next can be estimated based on the wake up factor for returning to the normal power mode.

On the other hand, if it is determined that the power saving mode before the wake up was the RAM storage mode (NO in step S621), since power is not being supplied to the LAN I/F 208, a job cannot be received via the LAN 106. Consequently, the return to the normal power mode will always be performed based on a wake up instruction from the operation unit 102. Therefore, the power saving mode that is desirable to enter next cannot be estimated based on the above-described two wake up factors.

Consequently, if the pre-wake up power saving mode was the RAM storage mode, in step S625, the power saving mode wake up information 801 is not updated at this point. In step S626, a RAM storage mode wake up flag indicating that the data processing apparatus 100 has just woken up from the RAM storage mode that is stored in the RAM 202 is switched ON, and the power saving mode wake up information update processing is finished.

Thus, if the power saving mode before the wake up was the RAM storage mode, the power saving mode wake up information 801 is not updated based on the wake up factor for returning to the normal power mode. In this case, the power saving mode wake up information 801 is updated based on an estimation of the type of job that was input just after waking up from the power saving mode.

The processing for updating the power saving mode wake up information 801 that is performed based on the job type will now be described in detail with reference to the flowchart illustrated in FIG. 7.

Figure 7:
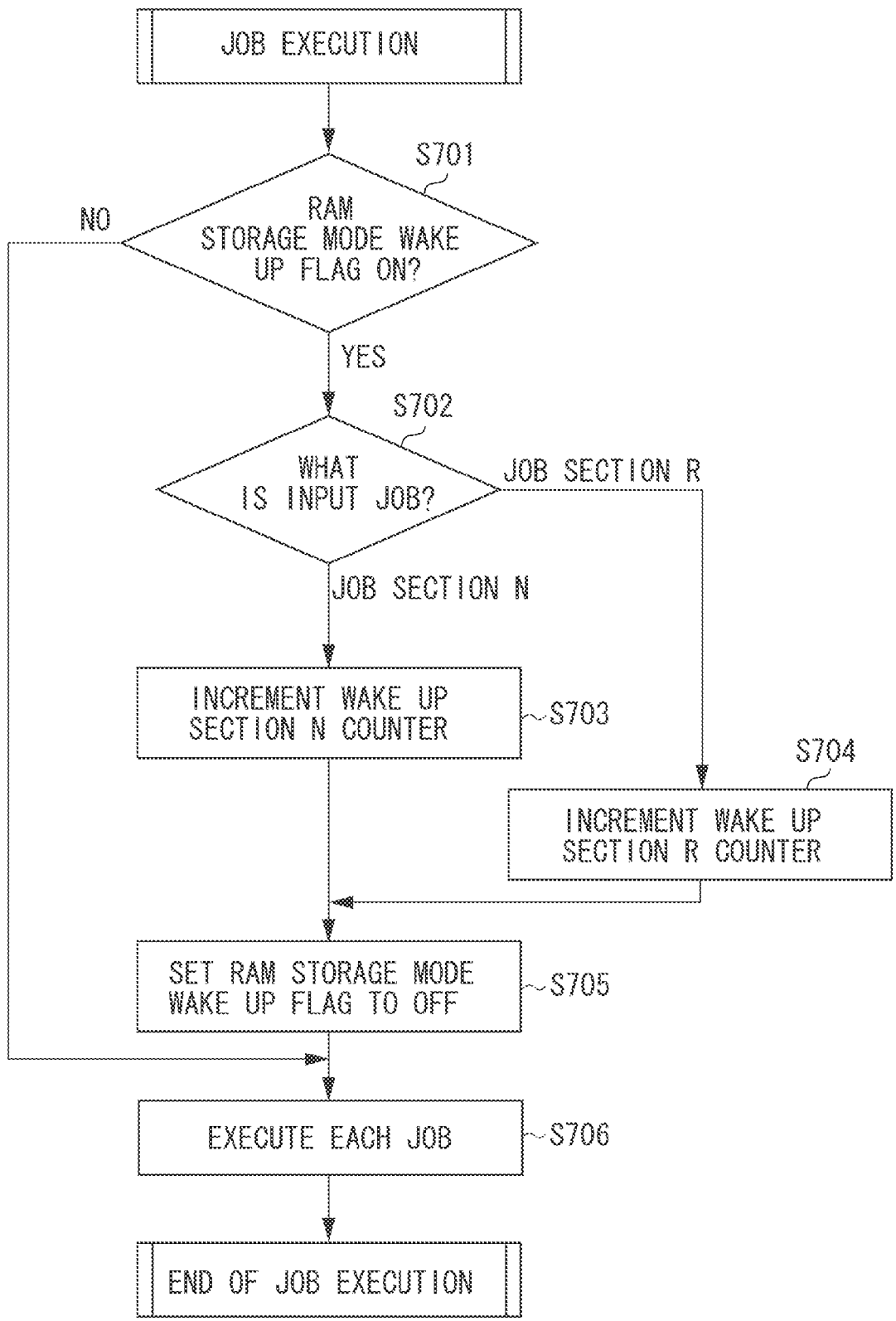
FIG. 7 is a flowchart illustrating an example of a processing procedure for executing a job according to a first exemplary embodiment.

FIG. 7 is a flowchart illustrating an example of a processing procedure for executing a job performed in step S502 of FIG. 5.

First, in step S701, when a job is input, the data processing apparatus 100 determines whether the RAM storage mode wake up flag stored in the RAM 202 is ON. If it is determined that the RAM storage mode wake up flag is OFF (NO in step S701), in step S706, processing based on the type of input job is executed without performing any special pre-processing, and the processing of step S502 in FIG. 5 is finished.

On the other hand, if it is determined that the RAM storage mode wake up flag is ON (YES in step S701), in step S702, the data processing apparatus 100 determines whether the type of input job belongs to a job section N or a job section R. The Job section N and the job section R will be described in more detail below. If it is determined that the input job belongs to the job section N ("JOB SECTION N" in step S702), in step S703, the wake up section N counter 802 in the power saving mode wake up information 801 is incremented.

On the other hand, if it is determined that the input job belongs to the job section R ("JOB SECTION R" in step S702), in step S704, the wake up section R counter 803 in the power saving mode wake up information 801 is incremented. Then, in step S705, the RAM storage mode wake up flag stored in the RAM 202 is set to OFF, and in step S706, processing is executed based on the type of job that was input.

Thus, after waking up from the RAM storage mode, the power saving mode wake up information 801 is updated with the power saving mode that is desirable to enter next based on the type of job input just after waking up.

FIG. 10 illustrates an example in which jobs executable by the data processing apparatus 100 are classified into the job section N and job section R according to the present exemplary embodiment. As stated above, the wake up section N counter 802 is counted up when there has been an event indicating that it is desirable to enter the N/W standby mode the next time when entering the power saving mode.

On the other hand, the wake up section R counter 803 is counted up when there has been an event indicating that it is desirable to enter the RAM storage mode the next time when entering a power saving mode.

For example, if a job input just after returning to the normal power mode is a job input via the LAN 106, like a PDL print job, usability is higher if the normal power mode can be returned to via the LAN 106.

Further, if a job input just after returning to the normal power mode is a job for which an operation of an operation unit 102 is required, like a send job or a copy job, it can be determined that usability is higher if the time until the device is in an idle state is shorter.

Therefore, if a job input just after returning to the normal power mode from the RAM storage mode is a PDL print job, the job is determined to belong to the job section N, so that the wake up section N counter 802 is incremented. On the other hand, if a job input just after returning to the normal power mode from the RAM storage mode is a job other than a PDL print job, the job is determined to belong to the job section R, so the wake up section R counter 803 is incremented.

Thus, when returning to the normal power mode from the N/W standby mode, the wake up section counter in the power saving mode wake up information 801 is updated based on whether the wake up factor came via the LAN I/F 208 or via the operation unit I/F 206. On the other hand, when returning to the normal power mode from the RAM storage mode, the wake up section counter in the power saving mode wake up information 801 is updated based on the type of job that is input just after waking up.

The power saving mode wake up information 801 is updated by repeating this processing each time the data processing apparatus 100 wakes up from the power saving mode. Thus, the power saving mode wake up information 801 is referred to when entering the power saving mode, and based on this information, the power saving mode to be entered is determined.

Figure 9A:
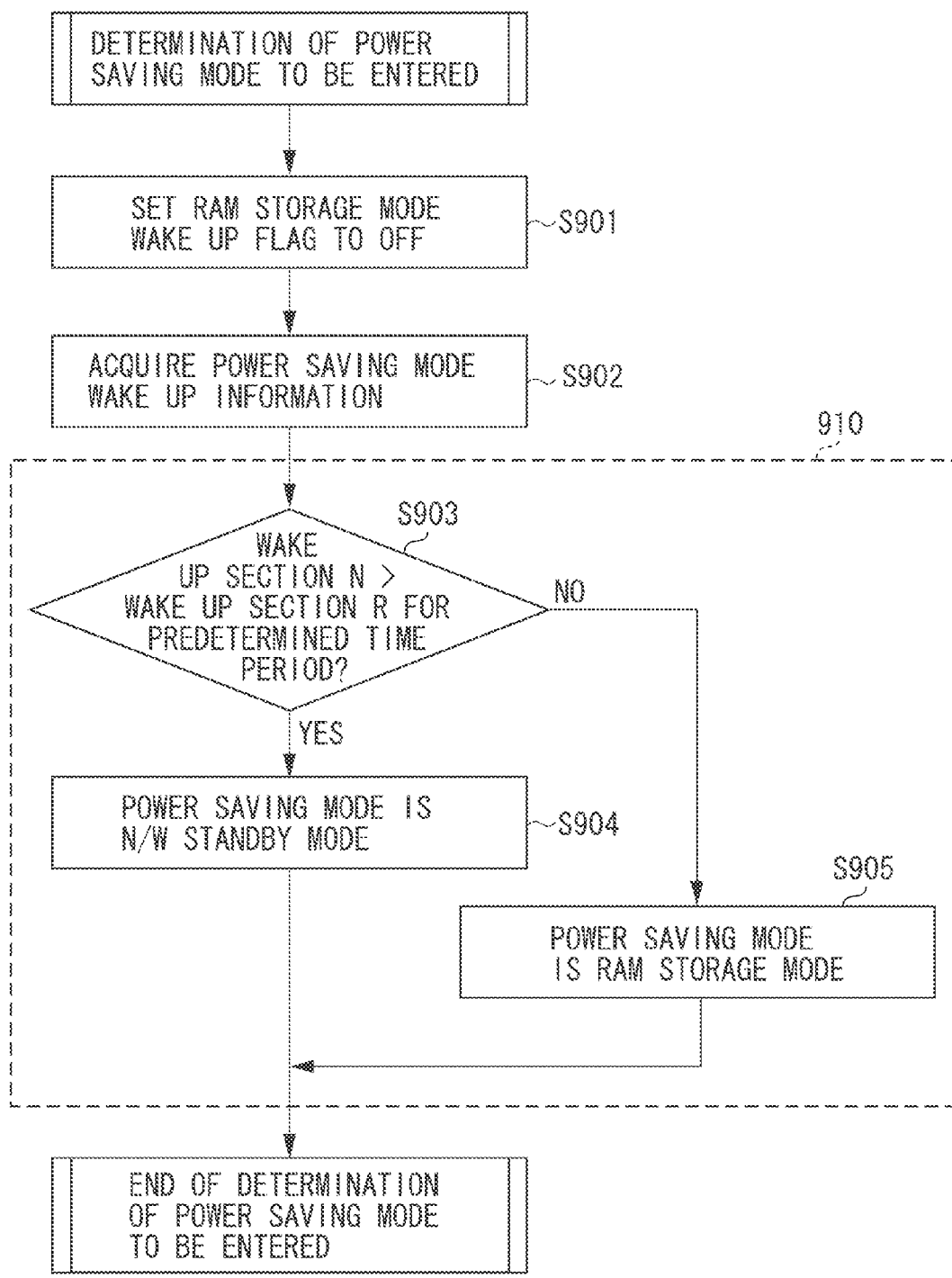
FIG. 9A and FIG. 9B are flowcharts illustrating an example of a processing procedure for determining a power saving mode to be entered and entering that power saving mode according to the first exemplary embodiment.
Figure 9B:
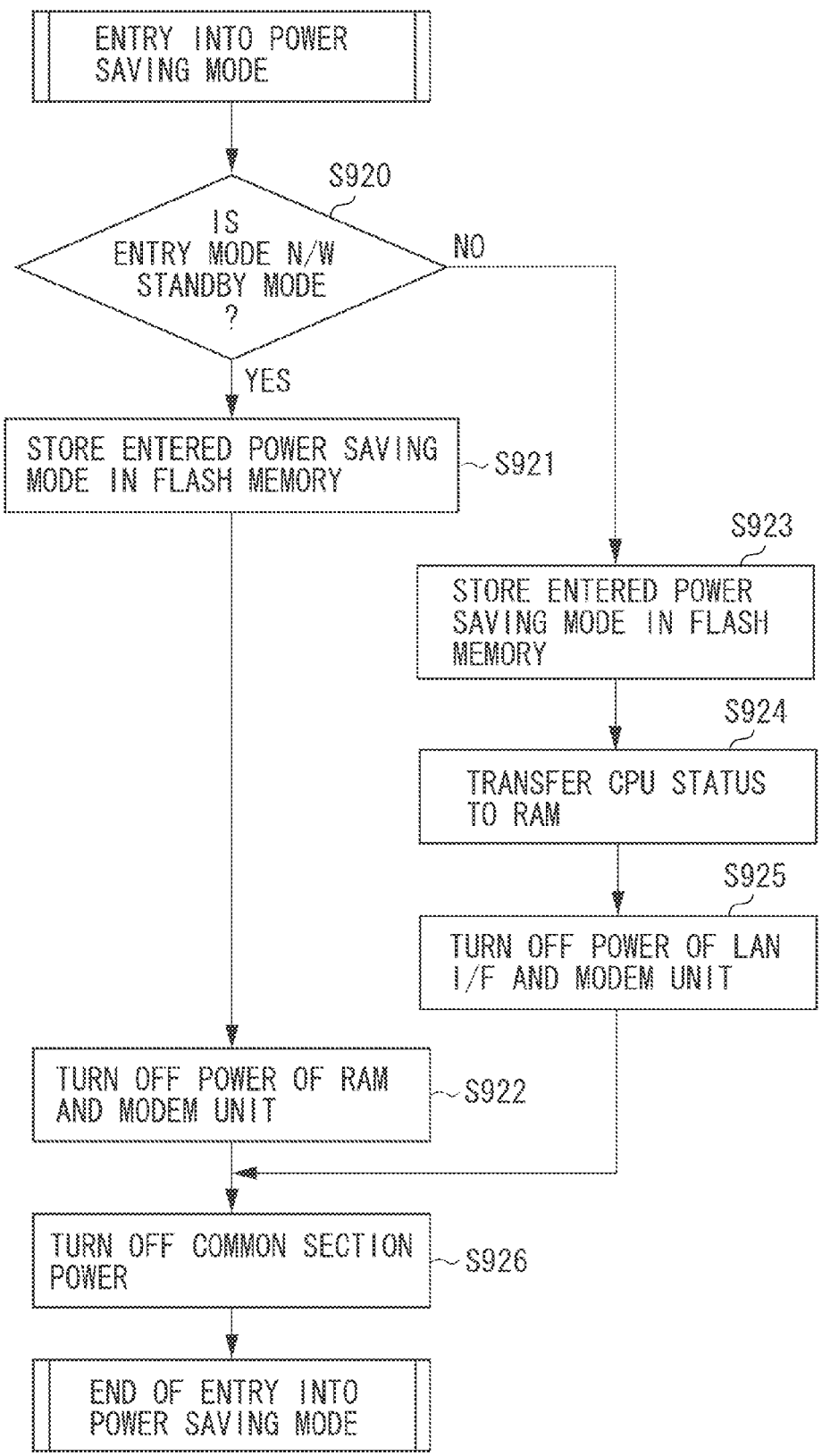

FIG. 9A is a flowchart illustrating an example of a processing procedure for determining the power saving mode to be entered in step S504 of FIG. 5. FIG. 9B is a flowchart illustrating an example of a processing procedure for entering the power saving mode in step S505 of FIG. 5.

First, if a condition for entering the power saving mode is satisfied (YES in step S503), the processing illustrated in FIG. 9A is started. In step S901, the RAM storage mode wake up flag is set to OFF. This processing is a fail-safe processing to the same processing as in step S705 of FIG. 7.

Next, in step S902, information about the value of the wake up N counter and the wake up R counter is acquired from the power saving mode wake up information 801. In this processing, first, information about the current date and time period is acquired from a (not illustrated) timer. Then, with this information as an index, the information about the value of the wake up section N counter 802 and the wake up section R counter 803 is acquired from the power saving mode wake up information 801.

Next, in step S903, the value of the wake up section N counter 802 and the value of the wake up section R counter 803 in a predetermined time period are compared. If it is determined that the value of the wake up section N counter 802 is greater than the value of the wake up section R counter 803 (YES in step S903), in step S904, the N/W standby mode is determined as the power saving mode to be entered, and the processing of step S504 in FIG. 5 is finished.

On the other hand, if it is determined that the value of the wake up section N counter 802 is equal to or less than the value of the wake up section R counter 803 (NO in step S903), in step S905, the N/W standby mode is determined as the power saving mode to be entered, and the processing of step S504 in FIG. 5 is finished.

Next, the processing (step S505) for entering the power saving mode illustrated in FIG. 9B is started. First, in step S920, the data processing apparatus 100 determines whether the power saving mode determined based on the procedure illustrated in FIG. 9A is the N/W standby mode. If it is determined that the power saving mode is the N/W standby mode (YES in step S920), in step S921, information indicating that the power saving mode to be entered is the N/W standby mode is stored in the flash memory 204.

In step S922, the CPU 201 turns off the power to the RAM 202 and the modem 209. Then, in step S926, the CPU 201 turns off the power to the common section 226, and the processing of step S505 in FIG. 5 is finished.

On the other hand, if it is determined that the power saving mode is the RAM storage mode (NO in step S920), in step S923, information indicating that the power saving mode to be entered is RAM storage mode is stored in the flash memory 204. Then, in step S924, the CPU 201 transfers its own CPU status register to a predetermined area in the RAM 202, and in step S925, turns off the power to the LAN I/F 208 and the modem 209. Then, in step S926, the CPU 201 turns off the power to the common section 226, and the processing of step S505 in FIG. 5 is finished.

Thus, according to the present exemplary embodiment, usability that is impaired by entering the power saving mode is improved by collecting and storing power saving mode wake up information 801, and selecting the power saving mode to be entered based on that information.

In the first exemplary embodiment, when returning to the normal power mode from the RAM storage mode, the power saving mode wake up information 801 is updated based on the job that is input just after the return to the normal power mode. On the other hand, in a second exemplary embodiment, in addition to the job input just after waking up, the power saving mode wake up information 801 is updated based on a determination elements such as a maintenance operation, a pressing plate open/close operation of the scanner 103, and whether a predetermined time has elapsed since waking up from the power saving mode.

The detailed processing performed according to the present exemplary embodiment will now be described with reference to the flowchart illustrated in FIG. 11. The basic points regarding the configuration of the image processing system and the data processing apparatus according to the present exemplary embodiment, and the sequence of entry into the power saving mode and return to the normal power mode by the data processing apparatus 100, are the same as those in the first exemplary embodiment. Therefore, in the present exemplary embodiment, the points that are different from the first exemplary embodiment will be described.

Figure 11A:
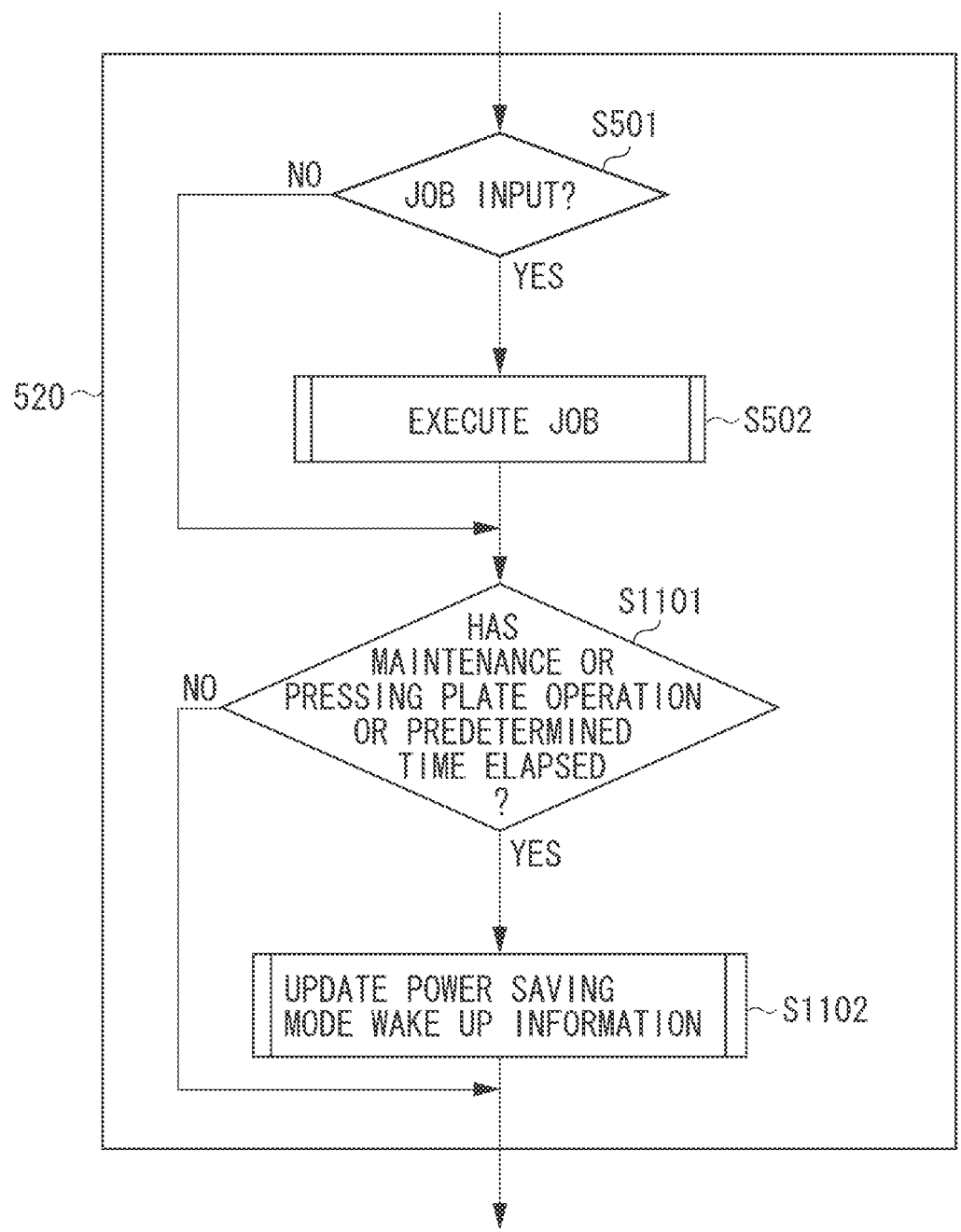
FIG. 11A and FIG. 11B are flowcharts illustrating an example of a processing procedure for executing a job in an idle state and updating power saving mode information according to a second exemplary embodiment.

FIG. 11A is a flowchart illustrating an example of a processing procedure in an idle state performed in the processing 520 in FIG. 5. The differences from the first exemplary embodiment will now be described.

If it is determined in step S501 that a job has not been input (NO in step S501), in step S1101, the data processing apparatus 100 determines whether a maintenance operation has been performed, whether a pressing plate operation of the scanner 103 has been performed, or whether a predetermined time or more has elapsed since returning to the normal power mode.

Examples of the maintenance operation include transition to a setting screen by the administrator operating the operation unit 102, and transition to a setting screen by a service person. Further, the pressing plate operation of the scanner 103 refers to the opening/closing of the pressing plate of the scanner 103 in order to execute a scan-to-box job or a send job.

Further, whether a predetermined time has elapsed since returning to the normal power mode refers to a case in which the difference between the current time and the time when the data processing apparatus 100 returned to the normal power mode (measured in advance by a not-illustrated timer) is greater than a predetermined time.

If it is determined in step S1101 that any of the above conditions is satisfied (YES in step S1101), in step S1102, the below-described update processing of the power saving mode wake up information 801 is performed, and the processing proceeds to step S503. On the other hand, if it is determined that none of the above conditions is satisfied (NO in step S1101), the processing proceeds directly to step S503.

Figure 11B:
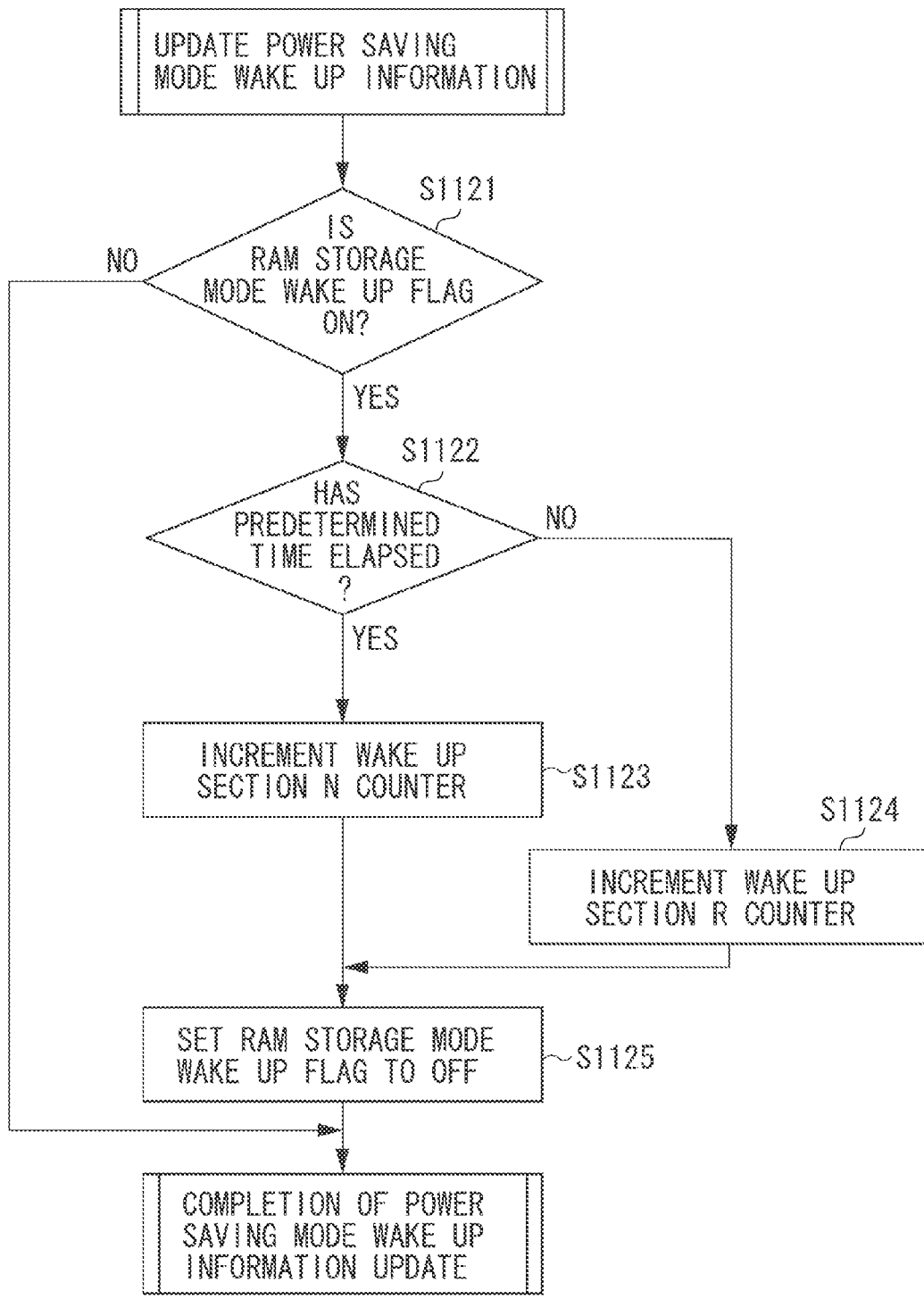

FIG. 11B is a flowchart illustrating an example of a detailed processing procedure for updating the power saving mode wake up information 801 in step S1102 illustrated in FIG. 11A.

First, in step S1121, the data processing apparatus 100 determines whether the RAM storage mode wake up flag is ON. If it is determined that the RAM storage mode wake up flag is OFF (NO in step S1121), the processing is finished without updating the power saving mode wake up information 801.

On the other hand, if it is determined that the RAM storage mode wake up flag is ON (YES in step S1121), in step S1122, the data processing apparatus 100 determines whether the condition satisfied in the determination performed in step S1101 of FIG. 11A is whether a predetermined time has elapsed since the return to the normal power mode. If it is determined that the satisfied condition is that a predetermined time has elapsed since the return to the normal power mode (YES in step S1122), in step S1123, the data processing apparatus 100 increments the wake up section N counter 802.

On the other hand, if the satisfied condition is another condition (NO in step S1122), i.e., a maintenance operation or a pressing plate operation, in step S1124, the wake up section R counter 803 is incremented. Then, in step S1125, the data processing apparatus 100 sets the RAM storage mode wake up flag to OFF, and the RAM storage mode wake up flag update processing is finished.

The present exemplary embodiment is based on a determination that, when a maintenance operation or a scanner pressing plate operation is performed after having returned to the normal power mode, usability is higher if the time from returning to the normal power mode until reaching an idle state is short. Similarly, the present exemplary embodiment is also based on a determination that, when an operation of an operation unit has not been performed for a predetermined time or longer after returning to the normal power mode, the possibility is high that a PDL print job will be subsequently input from the PC 105.

Thus, according to the present exemplary embodiment, by adding the above described determination processing, power saving control can be realized that has higher usability.

In the second exemplary embodiment, a different method for updating the power saving mode wake up information 801 from the first exemplary embodiment is described. In a third exemplary embodiment, a method is described for determining the power saving to be entered next that is based on the power saving mode wake up information 801.

The basic points regarding the configuration of the image processing system and the data processing apparatus according to the present exemplary embodiment, and the sequence of entry into the power saving mode and return to the normal power mode by the data processing apparatus 100, are the same as those in the first exemplary embodiment. Therefore, in the present exemplary embodiment, the points that are different from the first exemplary embodiment will be described.

Figure 12:
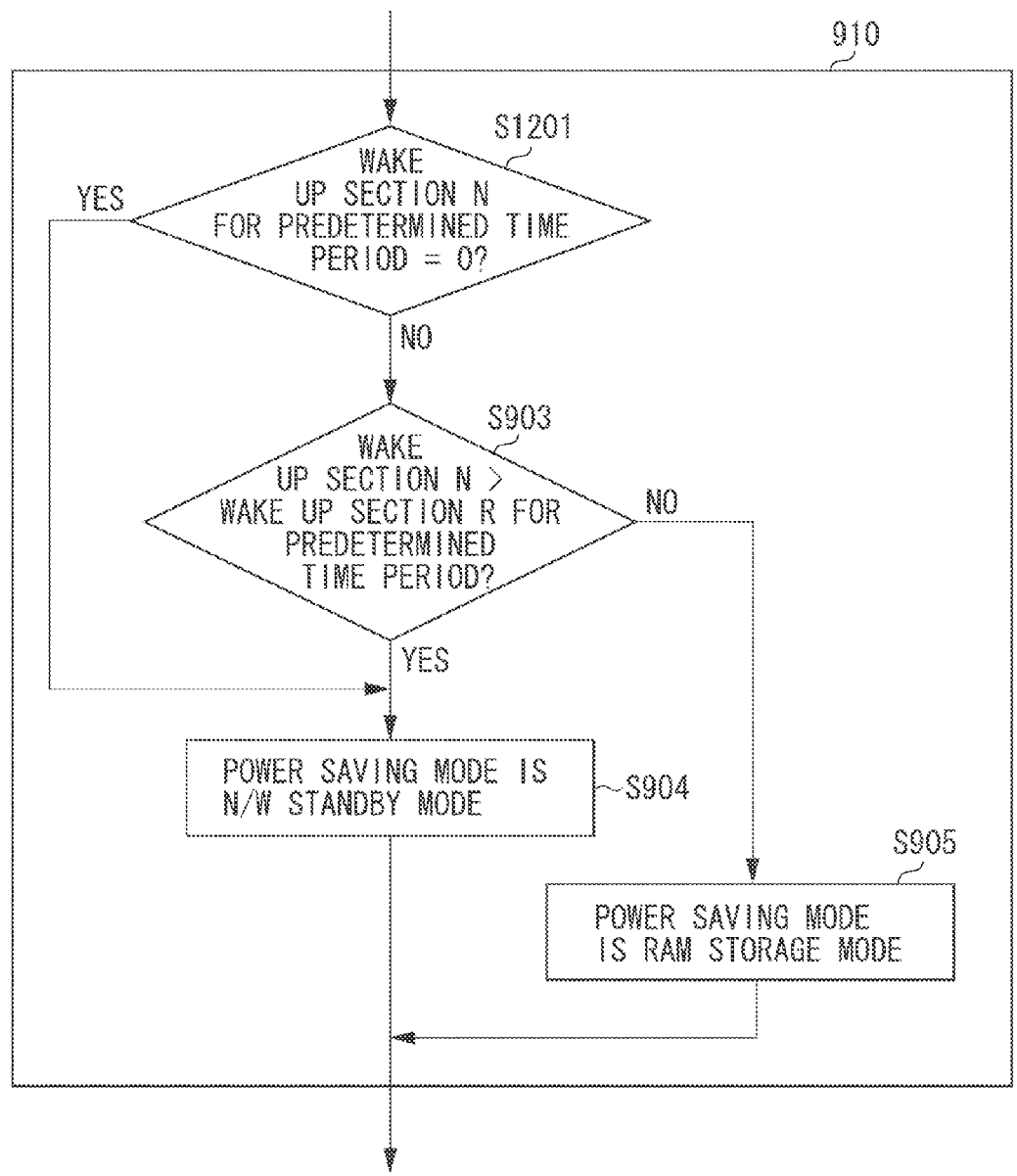
FIG. 12 is a flowchart illustrating an example of a processing procedure for determining a power saving mode to be entered according to a third exemplary embodiment.

FIG. 12 is a flowchart illustrating an example of a processing procedure for determining the power saving mode to be entered performed in the processing 910 in FIG. 9. The differences from the first exemplary embodiment will now be described.

First, after the power saving mode wake up information 801 is acquired in step S902, in step S1201, the data processing apparatus 100 determines whether the wake up section N counter is zero. If it is determined that the wake up section N counter is zero (YES in step S1201), in step S904, the N/W standby mode is determined as the power saving mode to be entered next. On the other hand, if it is determined that the wake up section N counter is not zero (NO in step S1201), the processing proceeds to step S903. Processing is subsequently executed in the same manner as the first exemplary embodiment.

By adding such determination processing, if an event determining that it is better to enter the N/W standby mode occurs even once during the date/time period set as the determination target, the data processing apparatus 100 can be configured to enter the N/W standby mode. This determination processing is advantageous when importance is placed on the drawback that, in the RAM storage mode, it is impossible to return to the normal power mode based on the input of a job from the LAN 106 (the data processing apparatus 100 cannot recognize a job from the PC 105).

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-049674 filed Mar. 6, 2012, which is hereby incorporated by reference herein in its entirety.

What is claimed is:

1. An image forming apparatus including a first power supply state configured to supply power to a part of the image forming apparatus, a second power supply state configured to stop supplying power to the part of the image forming apparatus and to receive data from an external device via a network, and a third power supply state configured to stop supplying power to the part of the image forming apparatus and not to receive data from the external device via the network, the image forming apparatus comprising:

a receiving unit configured to receive a first type job and a second type job that is different from the first type job;

a storage unit configured to store a first number of times of first type jobs received when the image forming apparatus is in the first power supply state and a second number of times of second type jobs received when the image forming apparatus is in the first power supply state;

a determination unit configured to determine whether the image forming apparatus is shifted from the first power supply state to the second power supply state, or from the first power supply state to the third power supply state based on the first number of times and the second number of times stored in the storage unit; and a control unit configured to shift the image forming apparatus from the first power supply state to the second power supply state in a case where the determination unit determines that the image forming apparatus is shifted from the first power supply state to the second power supply state, and shift the image forming apparatus from the first power supply state to the third power supply state in a case where the determination unit determines that the image forming apparatus is shifted from the first power supply state to the third power supply state.

2. The image forming apparatus according to claim 1, further comprising a network interface unit configured to receive the first type job from an external device via a network, wherein power is supplied to the network interface in the second power supply state, and power is not supplied to the network interface in the third power supply state.

3. The image forming apparatus according to claim 2, further comprising a nonvolatile memory, wherein power is supplied to the nonvolatile memory in the third power supply state.

4. The image forming apparatus according to claim 1, wherein the determination unit determines whether the image forming apparatus is shifted from the first power supply state to the second power supply state or from the first power supply state to the third power supply state in a case where a predetermined condition is satisfied in the first power supply state.

5. The image forming apparatus according to claim 1, further comprising a comparing unit configured to compare the first number of times with the second number of times, wherein the determination unit determines whether the image forming apparatus is shifted from the first power supply state to the second power supply state or from the first power supply state to the third power supply state based on a comparison result of the compating unit.

6. The image forming apparatus according to claim 5, further comprising an update unit configured to update the first number of times or the second number of times stored in the storage unit based on a type of the job received by the receiving unit in a case where the receiving unit has received the job.

7. The image forming apparatus according to claim 1, wherein the first type job is a PDL print job and the second type job is a copy job.

8. The image forming apparatus according to claim 1, wherein the second power supply state is a state where the image forming apparatus can be returned to the first power supply state in a case where data transmitted from an external device is received or a user operates an operation unit, and
wherein the third power supply state is a state where the image forming apparatus can be returned to the first power supply state in a case where a user operates an operation unit.

9. A control method for controlling an image forming apparatus including a first power supply state configured to supply power to a part of the image forming apparatus, a second power supply state configured to stop supplying power to the part of the image forming apparatus, and a third power supply state configured to stop supplying power to the part of the image forming apparatus, the method comprising:
receiving a first type job and a second type job that is different from the first type job;
storing, in a storage unit, a first number of times of first type jobs received when the image forming apparatus is in the first power supply state and a second number of times of second type jobs received when the image forming apparatus is in the first power supply state;
determining whether the image forming apparatus is shifted from the first power supply state to the second power supply state or from the first power supply state to the third power supply state, based on the first number of times and the second number of times stored in the storage unit;
shifting the image forming apparatus from the first power supply state to the second power supply state in a case where it is determined that the image forming apparatus is shifted from the first power supply state to the second power supply state, and
shifting the image forming apparatus from the first power supply state to the third power supply state in a case where it is determined that the image forming apparatus is shifted from the first power supply state to the third power supply state.

10. A non-transitory recording medium on which a program is recorded for causing a computer to execute the image forming apparatus method according to claim 9.

* * * * *